July 13, 1943. A. H. HABERSTUMP 2,324,152
TRACTOR SEAT
Filed July 16, 1938 2 Sheets-Sheet 1
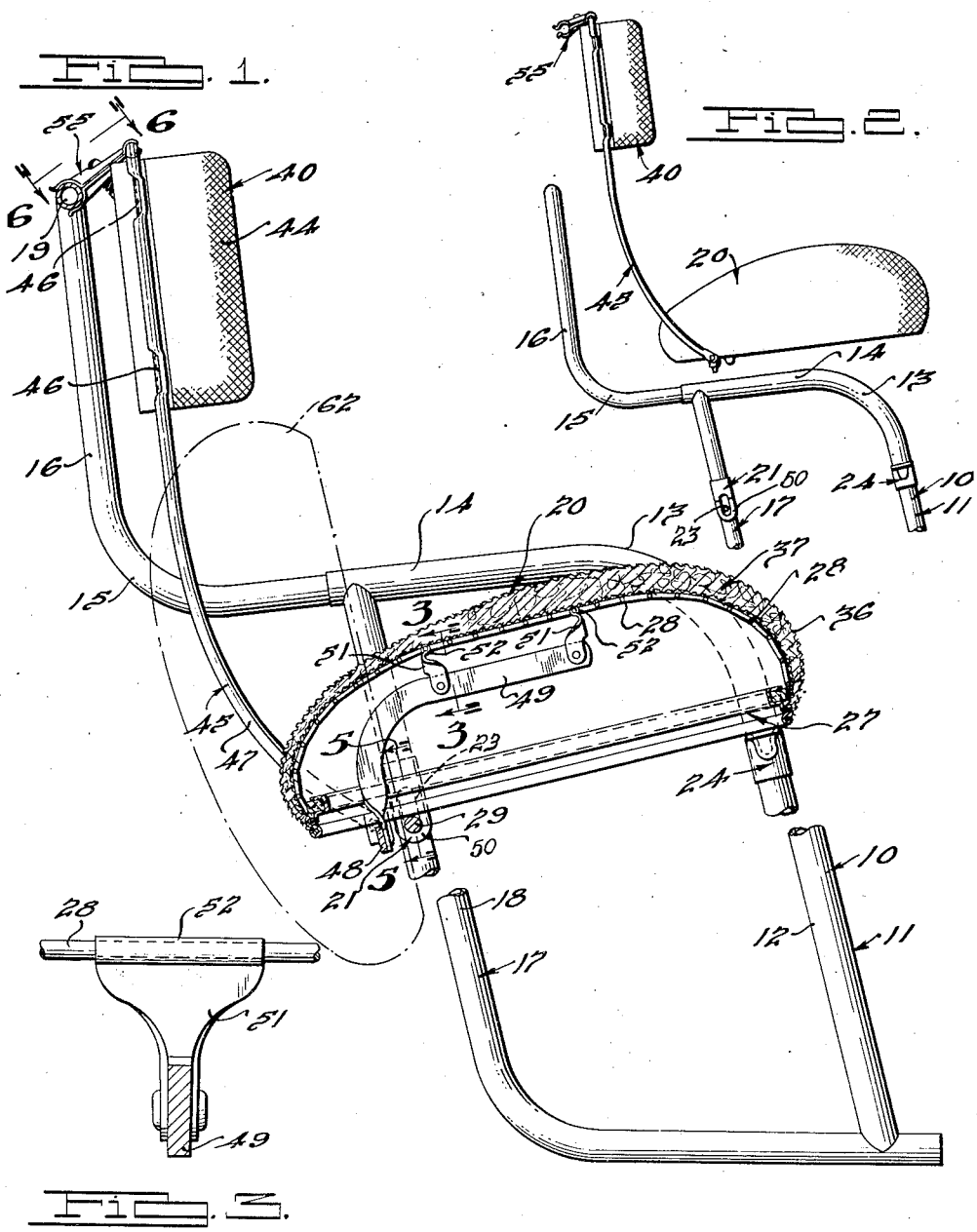
INVENTOR
Alfred H. Haberstump.
BY
Harness, Dickey & Pierce
ATTORNEYS July 13, 1943.   A. H. HABERSTUMP   2,324,152
TRACTOR SEAT
Filed July 16, 1938   2 Sheets-Sheet 2
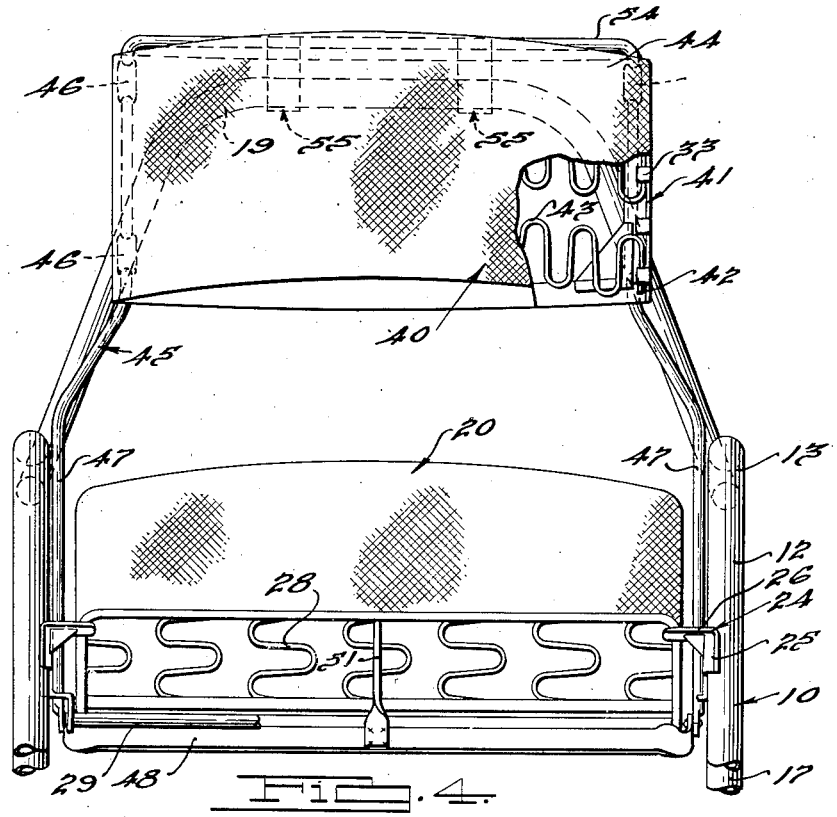
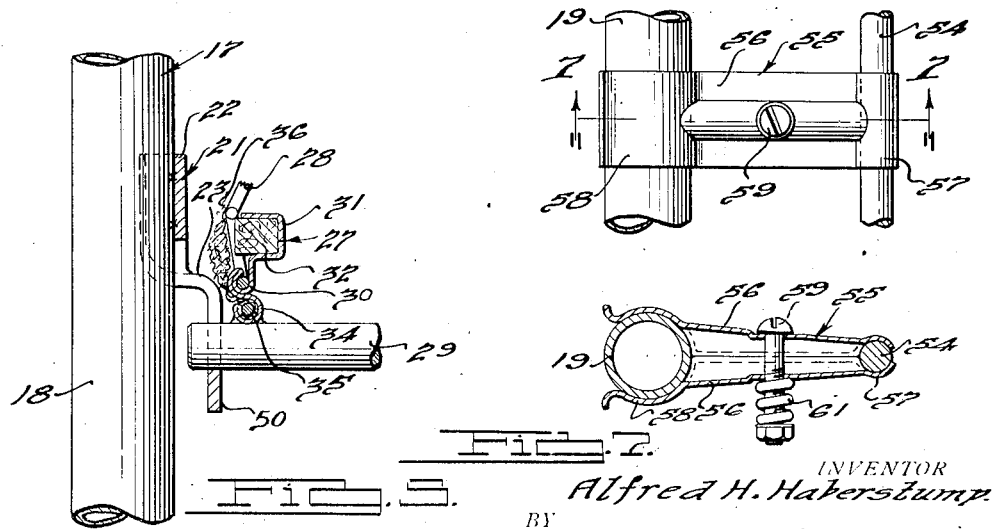
INVENTOR
Alfred H. Haberstump.
BY
Harness, Dickey & Pierce.
ATTORNEYS.

Patented July 13, 1943

2,324,152

UNITED STATES PATENT OFFICE 2,324,152

TRACTOR SEAT

Alfred H. Haberstump, Detroit, Mich., assignor to The Murray Corporation of America, Detroit, Mich., a corporation of Delaware Application July 16, 1938, Serial No. 219,563

6 Claims. (Cl. 155—53)

My invention relates to seats and particularly to a seat having a frame from which the connected back and seat cushions may be removed.

The seat embodying the present invention was intended primarily to be used on tractors or a similar vehicle on which the seat is unprotected and from which the cushion element may be removed and stored in inclement weather. While the seat was invented primarily for a tractor or similar use, it is to be understood that it is not limited to this particular application since such seat may be employed in a stadium, on porches, in yards, and on other types of vehicles such as busses and the like.

The seat in general embodies a frame which may be permanently attached to the floor of a tractor, bus, theater, or the like or which may be unattached and shaped to stand on its legs without separate fastening means. The unit frame has side portions and an inverted U-shaped back portion to which the cushion is removably secured. The seat cushion is of a novel type provided with projecting pivots which rests in sockets on the rear leg from which it is removable. The front legs have projecting brackets for engaging and supporting the front end of the seat anad permitting the space between the side frame elements to be occupied when the seat is raised so that a driver may stand in a position to operate the tractor.

The seat back has rearwardly disposed spring clips which snap over the tubular back frame and pivot thereon. Arms extend downwardly from the seat back and are secured to a cross-member disposed under the seat cushion, the cross member at its central portion being connected to the sinous type of spring strips from which the seat cushion is constructed. As the sinuous spring is deflected by the weight of an occupant, the back moves downwardly independent of the seat frame so that a unison type of seat and back is provided which moves upwardly and downwardly with an occupant. As pointed out hereinabove, the pivots on the seat cushion are disposed in slots in the rear leg brackets so that the seat may be tilted upwardly and also entirely removed along with the back when the pivots are moved out of the brackets and the spring clips are snapped from the back portion of the tubular frame.

Accordingly, the main objects of my invention are: to form a frame of tubular elements having front and rear legs and a tubular inverted U-shaped back; to provide a seat cushion for a tubular seat construction having projecting pivots which rest in slots in brackets disposed on the back legs; to pivot a seat on the back legs of a seat frame and have the front edge rest on lugs extending inwardly from the side frame to provide an open frame when the seat is raised; to provide a back cushion for a seat having pivoted snap fasteners which are engageable with the tubular back frame element about which they pivot; to provide downwardly disposed arms on a seat back which are attached to a cross-member under the seat cushion, which cross-member is attached by a bracket to sinuous springs which form the resilient elements of the cushion; to provide a seat and back cushion which are interconnected by an element attached to the spring surface of the seat; to provide a seat and back cushion which are pivotally attached to the seat frame and which are removable therefrom; and in general to provide a frame with seat and back cushions which are simple in construction and economical to manufacture.

Other objects and features of novelty of my invention will be specifically pointed out or will become apparent when referring, for a better understanding of my invention, to the following description taken in conjunction with the accompanying drawings wherein:

Figure 1 is a sectional view with parts broken away, of a seat having a back and seat cushion thereon embodying features of my invention;

Fig. 2 is a reduced view of the seat construction illustrated in Fig. 1 with the seat and back cushions removed therefrom;

Fig. 3 is an enlarged sectional view of the structure illustrated in Fig. 1, taken along the line 3—3 thereof;

Fig. 4 is a front view, in elevation, with parts broken away of the seat structure illustrated in Fig. 1;

Fig. 5 is an enlarged sectional view of the structure illustrated in Fig. 1, taken along the line 5—5 thereof;

Fig. 6 is an enlarged sectional view of the structure illustrated in Fig. 1, taken along the line 6—6 thereof, and Fig. 7 is an enlarged sectional view of the structure illustrated in Fig. 6, taken along the line 7—7 thereof.

The seat embodying my invention comprises a frame 10 constructed from a tubular element 11 forming the front legs 12, which is rearwardly formed at 13 to provide a substantially horizontal portion 14 which is curved at 15 to extend upwardly forming a back frame 16 of downwardly presented U-shape. Second tubular portions 17 of L-shape are joined to the end of the leg portion 12 and form the rear legs 18 of the seat frame. The two sides of the frame thus formed in this manner are interconnected across the top by the base portion 19 of the inverted U forming the back portion 16 of the frame.

Brackets 21 are provided on the rear legs 18 having an arcuate portion 22 which mates with the tubular portion of the leg and is welded or otherwise secured thereto and a portion 50 extending outwardly therefrom having a slot 23 for a purpose hereinafter explained. The front legs are provided with angular shaped brackets 24 having an arcuate portion at 25 which is welded or otherwise secured to the front leg portion 12 and a horizontally extended portion 26 for receiving and supporting the front side edge of the seat cushion.

The seat cushion 20 comprises a frame 27 having a plurality of arcuately shaped sinuous springs 28 extending thereacross. The spring seat thus constructed is similar to that illustrated and described in the copending application of Alfred H. Haberstump Serial No. 205,908 filed May 4, 1938, issued on October 22, 1940 as Patent No. 2,218,708, and assigned to the assignee of the present invention. The seat frame near its rear end is provided with a cross-rod 29 which projects laterally from the side of the frame 27 as illustrated in Fig. 5. The frame 27 herein illustrated is formed in a manner to provide a channel 31 in which a sound deadening material 32 is provided forming a fulcrum over which the sinuous spring 28 is fastened. Adjacent to the channel, the frame is bent to provide longitudinally extending channel portions 30, 34 and recessed portions, as illustrated and described in the Patent No. 2,172,942, issued September 12, 1939, and assigned to the assignee of the present invention.

The ends of the sinuous springs 28 are inserted in the channel portion 30 and moved axially into a recessed portion where it becomes anchored when deflected over the fulcrum material 32. An open channel-shaped portion 34 is formed at the bottom of the frame in which a welt 35 stitched in the edge of a trim material 36 is anchored. It will also be noted in Fig. 5 that the ends of the rod 29 may be dropped through the slot 23 in the bracket 21 to pivot therein. The front end of the seat rests upon the portion 26 of the bracket 24 and when tilted to a vertical position permits the occupant to stand between the seat frame. Suitable padding 37, of cotton, felt, sponge rubber, or the like, is placed over the sinuous springs 28 over which the trim material 36 is stretched.

The back cushion 40 embodies a frame 42 of rectangular shape, having suitable channel and recess portions 33 therein in which the ends of laterally disposed sinuous spring strips 43 are anchored. Suitable pad and cover material 44 is stretched over the spring surface thus provided and tacked, clinched, or otherwise secured to the frame 41. It is to be understood that a split channel portion 34 may be provided on the frame in which the welt 35, stitched in the marginal edge of the cover material, may be disposed. This construction would then be the same as that above described for the seat cushion.

The back cushion thus provided has an inverted U-shaped rod 45 disposed across its top and riveted or otherwise secured at 46 to the side of the frame 41. The downwardly disposed legs 47 of the rod 45 are pivoted to a cross-member 48 which is separated from but disposed beneath the rear end of the seat frame 27. The cross member 48 has an angle shaped strap 49 secured to its central portion on which arms 51 are pivoted having hooked ends 52 disposed about spaced convolutions of the central sinuous spring strip 28. When a load is applied to the seat by an occupant sitting thereon, the central sinuous springs 28 will be deflected downwardly carrying therewith the legs 47 of the rod 45 and the seat back 40 will move downwardly along therewith.

The top portion 54 of the bar 45 has a pair of clamps 55 secured thereto and to the top portion 19 of the seat frame. The clamp 55 embodies a pair of like stampings 56 having arcuate end portions 57 and 58. A bolt 59 extends through the stampings having a spring 61 thereon which urges the stampings together. The arcuate end 57 engages the top portions of the bar 45 to pivot thereon while the arcuate portion 58 may be snapped over the bar 19 about which it may pivot, and by means of which the seat back is removable from the frame.

The seat cushion 20 may be tilted upwardly to a position 62 illustrated in dot and dash lines in Fig. 1, permitting the operator to stand in a position to operate the tractor when the seat is employed thereon. The back 40 will move down slightly when the cushion is tilted as the end of the legs 45 describe on arc about the rod 29. The arcuate portion 58 of the spring clips 55 may be snapped from the bar 19 of the frame permitting the back 40 and seat cushion 20 to be lifted from the frame, as illustrated in Fig. 2. This permits the cushion portion of the seat to be removed in inclement weather or at any time when the tractor or seat cushions are not in use. The spring clip 55 permits the upward and downward movement of the back along with the occupant as the cushion 20 is constantly deflected through the interconnection effected by the rod 45.

As pointed out hereinabove, I have shown for the purpose of illustration the seat as having the frame thereof constructed to be rigidly attached to a tractor, bus, or the like, but it is to be understood that the rear leg portions can be extended to the rear instead of forwardly so that the seat may be portable and capable of standing on its legs without the use of clamps. The construction permits the interconnection of the seat and back so as to deflect in unison and also permits the removal of the back and seat cushions from the frame as a unit.

While I have described and illustrated a single embodiment of my invention, it will be apparent to those skilled in the art that various changes, omissions, additions, and substitutions may be made therein without departing from the spirit and scope of my invention, as set forth in the accompanying claims.

What I claim is:

1. The combination in a seat, of a seat cushion embodying a frame, spring strips spanning said frame forming a spring surface, a back cushion, a bar extending from the back cushion below the seat cushion and disconnected therefrom, means connected to said spring surface and pivots connecting said bar to said means to cause the back cushion to move in unison therewith when the spring surface is moved.

2. In a seat construction, a frame, a seat cushion having a supporting portion and a plurality of sinuous spring strips forming a spring surface, a back cushion, an element extending from the back cushion below said seat cushion, and means pivotally interconnecting the lower extremity of said element to one or more convolutions of one of said spring strips near the center of the cushion to have the back move when the spring strip is deflected.

3. In a seat construction, the combination with a frame embodying side elements joined across the back at the top, a seat cushion, means releasably supporting the seat cushion for pivotal movement to the rear portion of the side elements, a back cushion, means releasably supporting the back cushion to the rear portion of the side elements which permits the vertical movement of the back cushion relative to the elements, and brackets extending inwardly from the front end of the side elements to support the seat cushion with the space between the frame open when the seat cushion is tilted upwardly, and means interconnecting said two cushions which are removable as a unit from said frame.

4. In a seat construction, the combination with side frame elements, said side frame elements being connected at the top, back and seat cushions releasably supported on said side frame elements, spring strips spanning opposite sides of said seat cushion, a bar extending downwardly from said back cushion below said seat cushion and disconnected therefrom, rigid means connected to the spring strips in the medial portion thereof and extended below the spring surface of said seat cushion, pivot means interconnecting the rigid means to said bar which is moved downwardly with the spring strips when deflected to move the back cushion therewith.

5. In a seat construction, a frame embodying tubular elements forming side portions which are joined at the back by a portion of inverted U-shape, brackets on the inner side of said side portion near the rear thereof, a seat cushion having springs therein, projecting pivots on said seat cushion which releasably engage said brackets, inwardly directed spaced brackets near the front of the side portions on which the front end of the seat cushion rests, a back cushion, means for releasably supporting the back cushion on the back portion of the frame which permits the vertical movement of the back portion relative to the frame, means on said back cushion extending below said seat cushion and movable with the back cushion, and means interconnecting said first means to a spring of said seat cushion to cause the back cushion to move in unison therewith.

6. In a seat construction, a frame embodying tubular elements forming side frame portions, a seat cushion, sinuous spring strips spanning opposite sides of said cushion, a back cushion, means for releasably supporting said seat cushion on said frame, means interconnecting the back cushion to the central portion of at least one of said spring strips to have the back move when a spring strip is deflected, and vertically movable means for releasably supporting the back cushion on said frame.

ALFRED H. HABERSTUMP.